April 11, 1961            A. KLEIN            2,979,288

AIRCRAFT PROPELLER ARRANGEMENT AND MEANS FOR ELONGATING SAME

Filed Jan. 15, 1959

INVENTOR.
ALBERT KLEIN

BY

ATTORNEYS

20;United States Patent Office 2,979,288
Patented Apr. 11, 1961

2,979,288

AIRCRAFT PROPELLER ARRANGEMENT AND MEANS FOR ELONGATING SAME

Albert Klein, 1561 Glenmont Road, Cleveland, Ohio

Filed Jan. 15, 1959, Ser. No. 786,985

5 Claims. (Cl. 244—55)

This invention relates generally to aircraft construction, but has reference more particularly to aircraft employing propellers which can be elongated.

In aircraft of conventional design, the length of the propeller blades is fixed or limited, due to the fact that the aircraft, when landing or taking off, is in a substantially horizontal position, and the length of the blades must be such that the tips of the blades cannot touch the ground.

On the other hand, if the propeller blades could be elongated, during flight, particularly in multi-engine aircraft, a number of advantages could be obtained, including a marked decrease in fuel consumption, and a considerable increase in speed, altitude of flying, and overall safety.

The present invention, accordingly, has, as its primary object, the provision of aircraft, particularly multi-engine aircraft, in which certain of the propellers, or propeller blades, are elongatable, whereby these blades can be extended or elongated during flight, thereby enabling the other engines to be stopped, and thereby effecting a marked decrease in fuel consumption, and a commensurate increase in speed, altitude of flying and overall safety.

Another object of the invention is to provide a novel elongatable propeller, and novel means for elongating or extending the propeller blades.

Other objects and advantages of my invention will be apparent during the course of the following description.

In the accompanying drawings forming a part of this specification, and in which like numerals are employed to designate like parts throughout the same, Fig. 1 is a diagrammatic front elevational view of a four-engine aircraft, in which the two outboard engines are provided with elongatable propellers;

Figure 1:
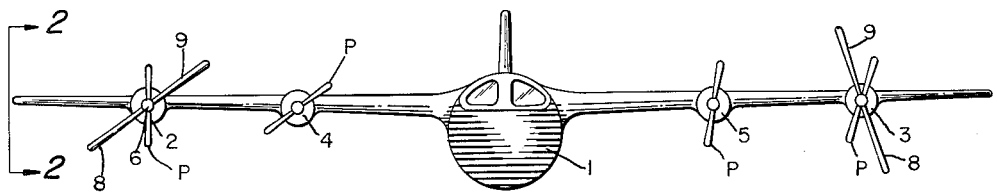
Figure 2:
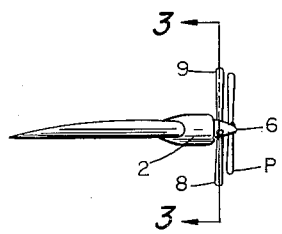
Fig. 2 is a fragmentary side elevational view, as viewed in the direction indicated by the lines 2—2 of Fig. 1.

Referring more particularly to the drawings, reference numeral 1 designates generally a four-engine aircraft, having outboard engines 2 and 3, and inboard engines 4 and 5.

All of the engines are provided with propellers P of conventional fixed length, such that the propellers, when the engines are rotating, while the aircraft is landing, taking off, or on the ground, do not touch the ground.

The outboard engines 2 and 3 are, in this instance, provided rearwardly of the conventional propellers P, with propellers, the blades of which can be elongated or retracted.

For this purpose, the propeller hub 6 is cored out to provide diametric passageways 7, within which the propeller blades 8 and 9 are movable relatively to each other in the direction of their length.

The blades 8 and 9 are provided with rack portions 10, which are disposed in confronting spaced relation, and are in mesh with a pinion 11, which can be slowly rotated in either direction by suitable mechanism, not shown, but operable by the pilot.

Figure 3:
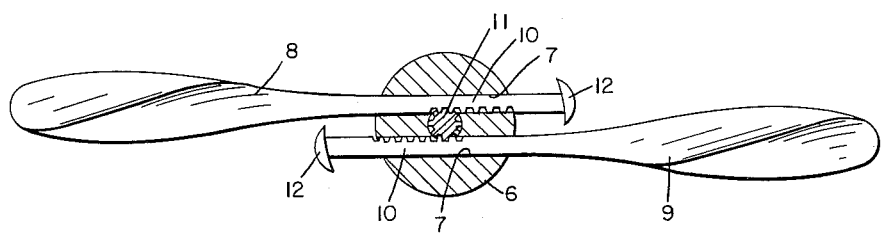
Fig. 3 is a cross-sectional view, taken on the line 3—3 of Fig. 2, but with the rear propeller blades in fully retracted condition.

The pinion 11, when rotated in one direction, causes the propeller blades 8 and 9 to be fully retracted, as shown in Fig. 3, so that the overall length of the propeller is no greater than that of the conventional propellers P.

Figure 4:
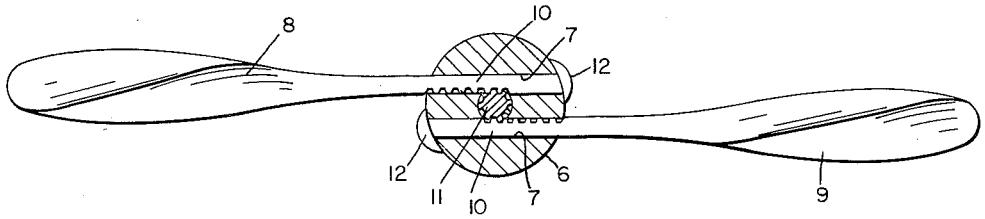
Fig. 4 is a view similar to Fig. 3, but with the rear propeller blades in fully extended or elongated condition.

The pinion 11, when rotated in the opposite direction, causes the propeller blades 8 and 9 to become extended or elongated, as shown in Figs. 1 and 4, and the degree of extension or elongation can be controlled, being limited, however, by the engagement of arcuate stops 12 at the inner ends of the propeller blades, with the hub 6 of the propeller.

By utilization of the elongatable propellers, a number of advantages are obtained, including the following:

(a) All four aircraft engines, with the outboard propellers 8—9 in fully retracted and non-rotating condition, can be started, without danger of contact of the blades of the propellers 8—9 with the ground.

(b) When the aircraft becomes airborne, the propellers 8—9 can be slowly extended or elongated by the pilot, to their fully extended position, after which the pilot by means of a clutch and shift mechanism similar to that used in automobiles (but not shown), can transfer the rotation of the propellers P of the outboard engines to the elongated propellers 8—9.

(c) When the propellers 8—9 are rotating at a predetermined speed, the pilot can stop the two inboard engines, and fly only with the elongated propellers 8—9. In this way, the lift, due to the elongation of the propellers, is increased, even without increased speeds, and economy in the use of fuel is effected, the saving, in some instances, being up to 40 or 50%.

(d) Due to the increased lift, in rarified atmospheres, obtained by elongation of the propellers, the altitude of flight can be increased, and, in consequence, the speed limit and overall safety increased.

(e) When the aircraft is about to land, the outboard propellers 8—9 can be fully retracted, the inboard engines started, and the rotation of the propellers 8—9 shifted to the conventional propellers P of the outboard engines, so that the aircraft can land, in the conventional manner, with all four engines operational, and without danger of contact of the blades of the propellers 8—9 with the ground.

(f) Due to non-use of the inboard engines during flight, the life of these engines is increased, and these engines can be "rotated" with the outboard engines at suitable intervals, thus increasing the overall life of all of the engines.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

Having thus described my invention, I claim:

1. In an aircraft of the character described having wings extending laterally therefrom, and a plurality of engines mounted on said wings, each engine having a propeller rotatable in a substantially vertical plane when the aircraft has landed and is on the ground, each propeller having an overall length such that these propellers cannot touch the ground when the aircraft has landed and the engines are rotating, and at least one of said engines having an additional propeller rotatable in a substantially vertical plane during horizontal flight of said aircraft, and whose overall length can be extended such that it would contact the ground if the aircraft landed with said last-named engine rotating, whereby the aircraft can be flown with said last-named propeller, when extended, and means for extending said last-named propeller.

2. An aircraft, as defined in claim 1, in which said last-named propeller comprises blades spaced laterally from each other, and said means moves said blades relatively to each other in the direction of their length.

3. An aircraft, as defined in claim 2, in which said blades are provided with confronting rack portions, and a rotatable pinion is disposed between said portions, and is in mesh therewith.

4. An aircraft, as defined in claim 3, including means on said blades for limiting movement of said blades in one direction.

5. In an aircraft of the character described, a pair of inboard engines, a pair of outboard engines, all of the engines having conventional propellers of fixed length, such that these propellers cannot touch the ground when the aircraft has landed and the engines are rotating, at least one pair of said engines having additional propellers whose overall length can be extended, such that they would contact the ground if the aircraft landed with the engines of said additional propellers rotating, whereby the aircraft can be flown with said extensible propellers, when extended, and means for extending said extensible propellers.

References Cited in the file of this patent

UNITED STATES PATENTS

| | | |
|---|---|---|
| 616,712 | Lenzner | Dec. 27, 1898 |
| 1,077,187 | Bissell | Oct. 28, 1913 |
| 2,312,624 | Caldwell | Mar. 2, 1943 |
| 2,437,789 | Robins | Mar. 16, 1948 |

FOREIGN PATENTS

| | | |
|---|---|---|
| 878,743 | France | Oct. 26, 1942 |
| 970,741 | France | June 21, 1950 |